United States Patent Office 3,472,596
Patented Oct. 14, 1969

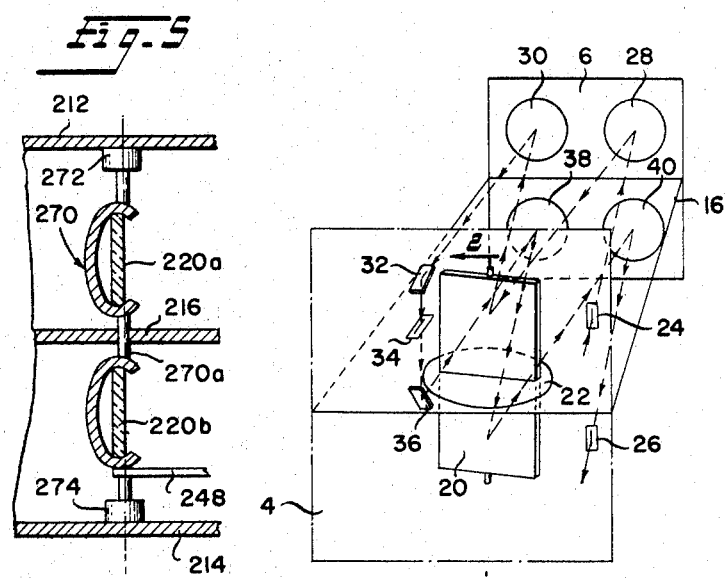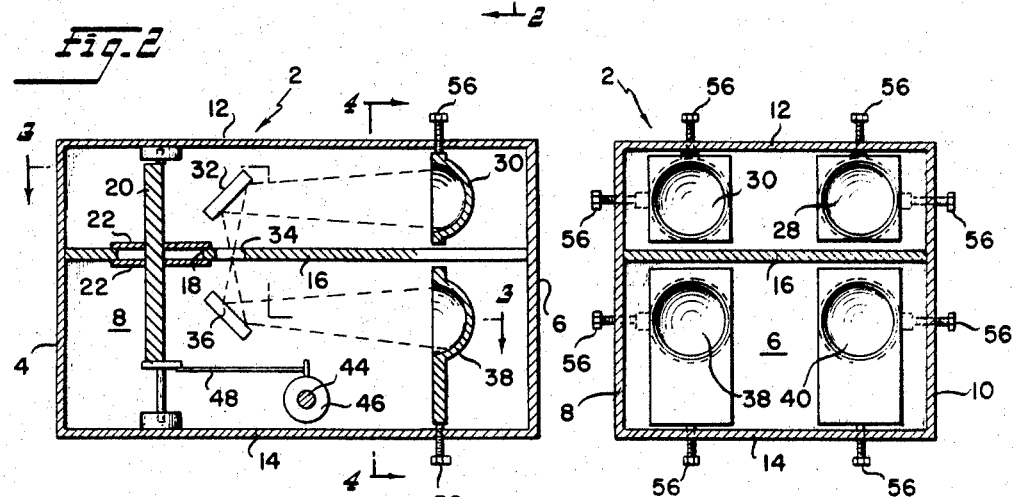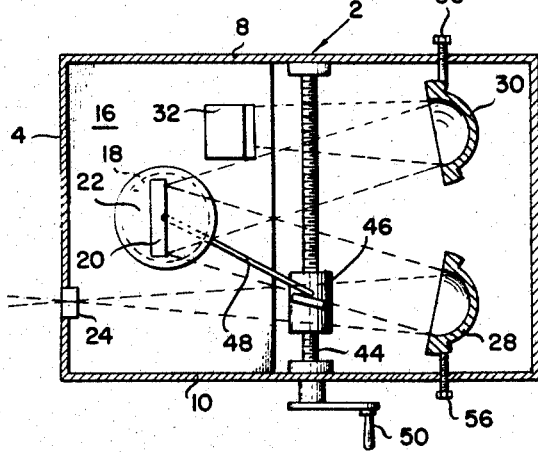

3,472,596
DOUBLE MONOCHROMATOR
Hirsch I. Mandelberg, 6201 Pearce Ave.,
Baltimore, Md. 21215
Filed Jan. 3, 1967, Ser. No. 606,752
Int. Cl. G02b 5/12
U.S. Cl. 356—101  9 Claims

ABSTRACT OF THE DISCLOSURE

A double monochromator the two optical sections of which include diffraction grating means mounted for rotation about a common axis, respectively, whereby wavelength scan tracking error is eliminated, and full resolution is achieved. The grating means comprises either a unitary element or an assemblage of a plurality of elements rotatably mounted in an opening contained in a light shield that separates the optical portions of the two monochromators.

---

This invention relates generally to a double monochromator, and more particularly to a double monochromator that utilizes either the two halves of the planar face of a single diffraction grating, or an assemblage consisting of two rigidly connected gratings having coplanar faces, the grating means being mounted for rotation in an opening contained in a light shield that separates the optical systems of the two monochromators.

As evidenced by the prior U.S. patent to Sherman No. 2,670,652, double monochromators have been proposed in the patented prior art which utilize gratings formed on opposite sides of a single rotatably mounted element. This type of prior apparatus possesses several inherent drawbacks. First, because of the particular arrangement of the components, for mirrors of a given focal length the instrument is twice as long as a single monochromator of the same focal length, whereby the instrument is quite unwieldy. Secondly, since the diffraction gratings are mounted back to back, the axis of rotation cannot be contained in more than one of the grating ruling faces, and consequently it is impossible to correct for the off-axis abberations that occur in this class of instrument. Finally, for the same reason the wavelength is not strictly proportional to the sine of the angle of rotation of the gratings, as is the case when the axis of rotation lies in the plane of the grating rulings, and consequently the wavelength calibration of the instrument is inaccurate and unreliable. The present invention was developed to avoid the above and other drawbacks of the known double monochromator apparatus.

The primary object of the present invention is to provide an improved double monochromator the two optical systems of which include the separate halves, respectively, of the single planar face of a dispersion element that is mounted for rotation in an opening contained in a light shield that normally isolates the two systems. Since the diffraction gratings for both the upper and lower monochromators forming the double monochromator are identical, being identically or essentially part of the same large rigid grating, the production of tracking errors as the grating is rotated is virtually eliminated, whereby the intermediate slit between the two monochromator systems may be narrowed to the same width as the entrance and exit slits without loss of intensity, so that greater spectral purity at the exit slit is obtained. Moreover, full resolution potential of the instrument is achieved while reducing simultaneously the background to the minimum value possible with a double monochromator.

Another object of the invention is to provide a compact extremely accurate double monochromator each section of which includes a pair of concave spherical mirrors and one half of a planar dispersion element, the mirror pairs being arranged on opposite sides of an opaque light shield, and the mirrors of each pair having their centers of curvature contained in a common horizontal plane. The dispersion element is rotatably mounted in an opening in the light shield, and sealing means are carried by the element for sealing the opening. According to a further object of the invention, means are provided for laterally adjusting the spherical mirrors, whereby the angles of incidence and diffraction may be equalized for the two halves of the instrument.

Another object of the invention is to provide a double monochromator the grating means of which includes a pair of rigidly interconnected rotatably mounted grating sections arranged on opposite sides of a common light shield, respectively, said grating sections having coplanar faces containing the grating rulings.

Other objects and advantages of my invention will become apparent from a study of the following specification, when considered in the light of the accompanying drawing, in which:

FIG. 1 is a perspective schematic view of the double monochromator;

FIG. 2 is a sectional view taken along line 2—2 of FIG. 1;

FIGS. 3 and 4 are sectional views taken along lines 3—3 and 4—4 of FIG. 2, respectively; and FIG. 5 is a detailed sectional view of another embodiment of the invention.

Referring now to the drawing, the double monochromator includes a housing 2 having front and rear end walls 4 and 6, respectively, a pair of side walls 8, 10, and top and bottom walls 12 and 14, respectively. Extending horizontally across the housing from an intermediate portion of the front wall 4 is an opaque planar light shield 16, which shield contains adjacent the front wall 4 a circular opening 18. Extending through the opening 18 is a vertical dispersion element or grating 20 that is mounted for rotation about a vertical axis. The grating 20 carries a pair of spaced parallel seal disks 22 that engage the upper and lower surfaces of shield 16 adjacent the opening 18, and thereby prevent the direct passage of light through the opening.

On one side of the vertical plane that is normal to the front wall 4 and that contains the center of opening 18, the front wall contains a pair of vertically spaced slits 24, 26 above and below the plane of the shield 16, respectively. The upper slit is an entrance slit for receiving light from a conventional source, not shown, which light is directed upon a first spherical mirror 28 adjacent the rear wall 6. The light is reflected and collimated by mirror 28 upon the upper half of the diffraction grating 20, whereupon the dispersed light is directed to a second spherical mirror 30 on the opposite side of the aforementioned vertical plane from the mirror 28.

Light from mirror 30 is focussed upon intermediate slit 34 contained in shield 16 by reflection from a planar mirror 32 arranged at an angle of 45° relative to the shield 16. Light passing downwardly through the intermediate slit 34 is directed upon another planar mirror 36 also arranged at an angle of 45° relative to the shield 16 light is reflected from mirror 36 to spherical mirror 38, whereupon collimated light is directed upon the lower half of the diffraction grating 20. The dispersed light from grating 20 is directed to spherical mirror 40, which mirror reflects and focusses the light to the exit slit 26.

It is apparent that mirrors 28, 30 and 32 are on the opposite side of shield 16 from mirrors 36, 38 and 40, and that mirrors 28 and 40 are on the opposite side of the aforementioned vertical plane (which passes through the center of opening 18 normal to front wall 4) from mirrors 30, 32, 36 and 38.

For accurately adjusting the position of grating 20 about its vertical axis, there is provided a horizontal threaded shaft 44 that is rotatably mounted between side walls 8 and 10 and that carries the slidably shiftable internally threaded sleeve 46. The sleeve carries means engaging a radial arm 48 on the grating 20, where upon rotation of shaft 44 by handle 50 effects axial shifting of sleeve 46 and corresponding rotation of grating 20 about its vertical axis.

In accordance with an important feature of the invention, conventional adjusting means 56 are provided for adjusting the spherical mirrors so that the angles of incidence and reflection can be equalized for upper and lower halves of the instrument.

The surface of grating 20 directed toward the rear wall 6 is provided with dispersion rulings parallel to the axis of rotation, and the axis of rotation is contained in the plane of the rulings, as is customary in the art. By proper positioning of the mirrors, the two halves of the instrument track together throughout the range of wavelengths available by rotation of the dispersing element 20, whereby a linear relationship is obtained between the angular position of the grating and the wave length passed through the entire instrument. The side of grating 20 facing front wall 4 is normally smooth.

The light shield 16 and the seal disk means 22 serve to prevent scattered light from the upper monochromator (mirrors 28 and 30 and grating 20) from reaching the exit mirror 40 of the lower monochromator (mirrors 38 and 40 and grating 20). Owing to the use of the upper and lower halves of the same grating, there is absolutely no possibility of wavelength scan-tracking error between the two monochromators, so long as the angles of incidence and diffraction in the two halves are set equal. Because of the virtual elimination of tracking error, the intermediate slit 34 may be narrowed to the same width as the entrance and exist slits 24 and 26, respectively, without loss of intensity. Consequently, the full resolution potential of the instrument is achieved while reducing simultaneously the background to the minimum possible with a double monochromator.

Referring now to the alternative embodiment of FIG. 5, the rotary grating means includes a pair of grating sections 220a and 220b mounted in a rigid support 270 having a pair of shaft end portions journalled in bearings 272 and 274 carried by the upper and lower housing walls 212 and 214, respectively, and an intermediate shaft portion 270a journalled in a corresponding opening in light shield 216. Radial shaft 248 extends from the rigid assemblage 270 for the rotation thereof by conventional adjusting means similar to those illustrated in FIG. 3. It is apparent that the ruled faces of the grating sections 220a and 220b and the axis of rotation of the support 270 are contained in a common vertical plane.

In order to properly adjust the double monochromator, it is also possible to provide adjustable entrance and exit slit means, not shown, in accordance with another feature of the invention.

Although the invention has been illustrated and described with reference to a system of the Czerny-Turner type, it is apparent that the invention is applicable also to systems of the Ebert type.

What is claimed is:

1. A double monochromator, comprising
   housing means including a vertical front wall, and a horizontal planar shield extending rearwardly from an intermediate portion of said front wall, said shield containing an opening adjacent said front wall, said front wall containing an entrace slit on one side of said shield and on one side of a vertical plane that is normal to said front wall and passes through the center of the opening, said front wall containing also an exit slit vertically spaced from, and on the opposite side of said shield from, said entrance slit;
   vertical planar light dispersing means mounted in said shield opening for rotation about a vertical axis, the upper and lower ends of said dispersing means extending beyond said shield;
   a first mirror arranged on one side of said shield opposite said entrance slit for reflecting incident light upon said dispersing means;
   a second mirror on the same side of said shield as, and on the opposite side of said vertical plane from, said first mirror, said second mirror being disposed for receiving light dispersed from said dispersing means, said shield containing also an intermediate slit adjacent said front wall on said opposite side of said vertical plane;
   a third mirror adjacent said front wall for directing light reflected from said second mirror through said intermediate slit;
   a fourth mirror adjacent said front wall on the opposite side of said shield from said third mirror for receiving the light passing through said intermediate slit;
   a fifth mirror for reflecting upon said dispersing means the light reflected by said fourth mirror; and
   a sixth mirror for reflecting to said exit slit a portion of the light dispersed from said dispersing means, said first, second and third mirrors being on one side of said shield, and said fourth, fifth and sixth mirrors being on the opposite side of said shield, said first and sixth mirrors being on the opposite side of said vertical plane from said second, third, fourth and fifth mirrors.

2. A double monochromator as defined in claim 1, wherein said first, second, fifth and sixth mirrors are spherical mirrors.

3. A double monochromator as defined in claim 2, wherein said third and fourth mirrors comprise planar mirrors arranged at an angle of 45° relative to said shield, respectively.

4. Apparatus as defined in claim 1, and further including means for rotating said dispersing means about its vertical axis of rotation.

5. Apparatus as defined in claim 4, wherein said dispersing means comprises a unitary grating element.

6. A double monochromator as defined in claim 5, and further including means for sealing the space between said grating element and the wall of said shield opening.

7. Apparatus as defined in claim 6, wherein said sealing means are carried by said dispersing means for continuous cooperation with at least one surface of said shield.

8. Apparatus as defined in claim 4, wherein said dispersing means comprises a pair of grating sections arranged on opposite sides of said light shield, respectively, and rotatable support means rigidly supporting said sections with the grating faces thereof contained in a plane common with the axis of rotation of said support means.

9. Apparatus as defined in claim 1, wherein said first, second, fifth, and sixth mirrors are concave, said first mirror being spaced from the entrance slit a distance equal to its focal length, said second and fifth mirrors being spaced from the intermediate slit an optical distance equal to their respective focal lengths, and said sixth mirror being spaced from the exit slit a distance equal to its focal length.

References Cited

UNITED STATES PATENTS 2,670,652  3/1954  Sherman _____ 356—101
2,922,331  1/1960  Fastie et al. _____ 356—99

OTHER REFERENCES

Pierce: "The McMath Solar Telescope of Kitt Peak National Observatory," Applied Optics, vol. 3, No. 12, December 1964, pp. 1337–1346.

RONALD L. WIBERT, Primary Examiner
F. L. EVANS, Assistant Examiner

U.S. Cl. X.R.

356—162